US 8,416,153 B2

(12) United States Patent
Yoshikawa

(10) Patent No.: US 8,416,153 B2
(45) Date of Patent: Apr. 9, 2013

(54) HEAD MOUNT DISPLAY

(75) Inventor: Yuki Yoshikawa, Tokyo (JP)

(73) Assignee: Nikon Corporation, Tokyo (JP)

( * ) Notice: Subject to any disclaimer, the term of this patent is extended or adjusted under 35 U.S.C. 154(b) by 673 days.

(21) Appl. No.: 12/289,899

(22) Filed: Nov. 6, 2008

(65) Prior Publication Data

US 2009/0073082 A1    Mar. 19, 2009

Related U.S. Application Data

(63) Continuation of application No. PCT/JP2007/059376, filed on May 2, 2007.

(30) Foreign Application Priority Data

May 9, 2006    (JP) .................................. 2006-129855

(51) Int. Cl.
    *G09G 5/00*    (2006.01)
(52) U.S. Cl.
    USPC .......... 345/8; 345/7; 348/53; 349/11; 349/13; 359/13; 359/630
(58) Field of Classification Search .................. 345/8, 7; 348/53; 349/11, 13; 359/630, 13
    See application file for complete search history.

(56) References Cited

U.S. PATENT DOCUMENTS

| | | | | |
|---|---|---|---|---|
| 5,621,424 A | * | 4/1997 | Shimada et al. ................... | 345/8 |
| 6,034,653 A | * | 3/2000 | Robertson et al. ................ | 345/8 |
| 6,388,640 B1 | * | 5/2002 | Chigira et al. .................... | 345/8 |
| 6,771,424 B1 | * | 8/2004 | Amafuji et al. ................ | 359/632 |
| 7,310,072 B2 | * | 12/2007 | Ronzani et al. ................... | 345/8 |
| 7,542,012 B2 | * | 6/2009 | Kato et al. ......................... | 345/8 |
| 2002/0089469 A1 | * | 7/2002 | Cone et al. ......................... | 345/8 |
| 2002/0149545 A1 | * | 10/2002 | Hanayama et al. ............... | 345/7 |
| 2006/0119539 A1 | | 6/2006 | Kato et al. | |
| 2006/0221266 A1 | * | 10/2006 | Kato et al. .................... | 348/838 |
| 2006/0238878 A1 | * | 10/2006 | Miyake et al. ................ | 359/630 |
| 2007/0217001 A1 | * | 9/2007 | Ando ............................ | 359/409 |

FOREIGN PATENT DOCUMENTS

| | | |
|---|---|---|
| CN | 2750599 Y | 1/2006 |
| JP | A-06-078247 | 3/1994 |
| JP | A-2001-166703 | 6/2001 |
| JP | A-2003-329965 | 11/2003 |
| JP | A-2004-233908 | 8/2004 |
| JP | A-2005-215393 | 8/2005 |

OTHER PUBLICATIONS

Chinese Office Action issued in Chinese Patent Application No. 200780016988.9 on Mar. 12, 2010 (with translation).
Apr. 3, 2012 Notice of Reasons for Rejection issued in Japanese Patent Application No. 2008-514476 w/translation.

* cited by examiner

*Primary Examiner* — Lun-Yi Lao
*Assistant Examiner* — Sosina Abebe
(74) *Attorney, Agent, or Firm* — Oliff & Berridge, PLC

(57) ABSTRACT

A head mount display includes: an image display unit at which an image is displayed; an arm that supports the image display unit while allowing an orientation of the image display unit to be adjusted; a mounting unit that supports the arm and is used to attach the head mount display to a user; and a protective member extending from the arm to range on an outer side relative to the image display unit to protect the image display unit. The image display unit is positioned between the head of the user, to which the mounting unit is attached, and the protective member.

8 Claims, 12 Drawing Sheets

HEAD MOUNT DISPLAY

This application is a continuation of International Application No. PCT/JP2007/059376 filed May 2, 2007.

INCORPORATION BY REFERENCE

The disclosures of the following priority application and International application are herein incorporated by reference:

Japanese Patent Application No. 2006-129855 filed May 9, 2006;

International Application No. PCT/JP2007/059376 filed May 2, 2007.

BACKGROUND OF THE INVENTION

1. Field of the Invention

The present invention relates to a head mount display worn on the head of the user.

2. Description of Related Art

There is a portable display device known as a near-eye display or a head mount display in the related art, which is worn on the head of the user (see patent reference literature 1). The device is structured so that its display unit supported via a display arm is set in front of the user's eye.

Patent reference literature: Japanese Laid Open Patent Publication No. 2005-215393

While the display unit of the display device disclosed in the above publication is mounted so that its orientation relative to the display arm can be adjusted, the display unit may be displaced to an undesirable position relative to the display arm by an unexpected external force.

SUMMARY OF THE INVENTION

A head mount display according to a first aspect of the present invention includes: an image display unit at which an image is displayed; an arm that supports the image display unit while allowing an orientation of the image display unit to be adjusted; a mounting unit that supports the arm and is used to attach the head mount display to a user; and a protective member extending from the arm to range on an outer side relative to the image display unit to protect the image display unit, wherein: the image display unit is positioned between the head of the user, to which the mounting unit is attached, and the protective member.

It is preferable that the image display unit is positioned in front of one of a left eye and a right eye of the user to which the mounting unit is attached; and the protective member is disposed so as to range to a position at which the protective member does not block a visual field of another eye of the user.

It is preferable that the image display unit is positioned in front of one of a left eye and a right eye of the user to which the mounting unit is attached; and the protective member comprises an extended portion extending beyond the image display unit at least toward another side in front of another of the left eye and the right eye, toward a top side beyond the image display unit or toward a bottom side beyond the image display unit.

The extended portion may be constituted of a transparent material.

The extended portion may extend toward the other side and may be supported near an ear of the user on the other side.

The extended portion may include a nose pad ranging along a contour of a nose of the user so as to fit over the nose as the nose pad comes into contact with the nose of the user.

It is preferable to further include an illuminance sensor disposed at the protective member that detects a illuminance level of ambient light.

It is preferable that the illuminance sensor is disposed on a line substantially extending from an optical axis of an image departing the image display unit toward the user.

DESCRIPTION OF PREFERRED EMBODIMENTS

First Embodiment

Figure 1:
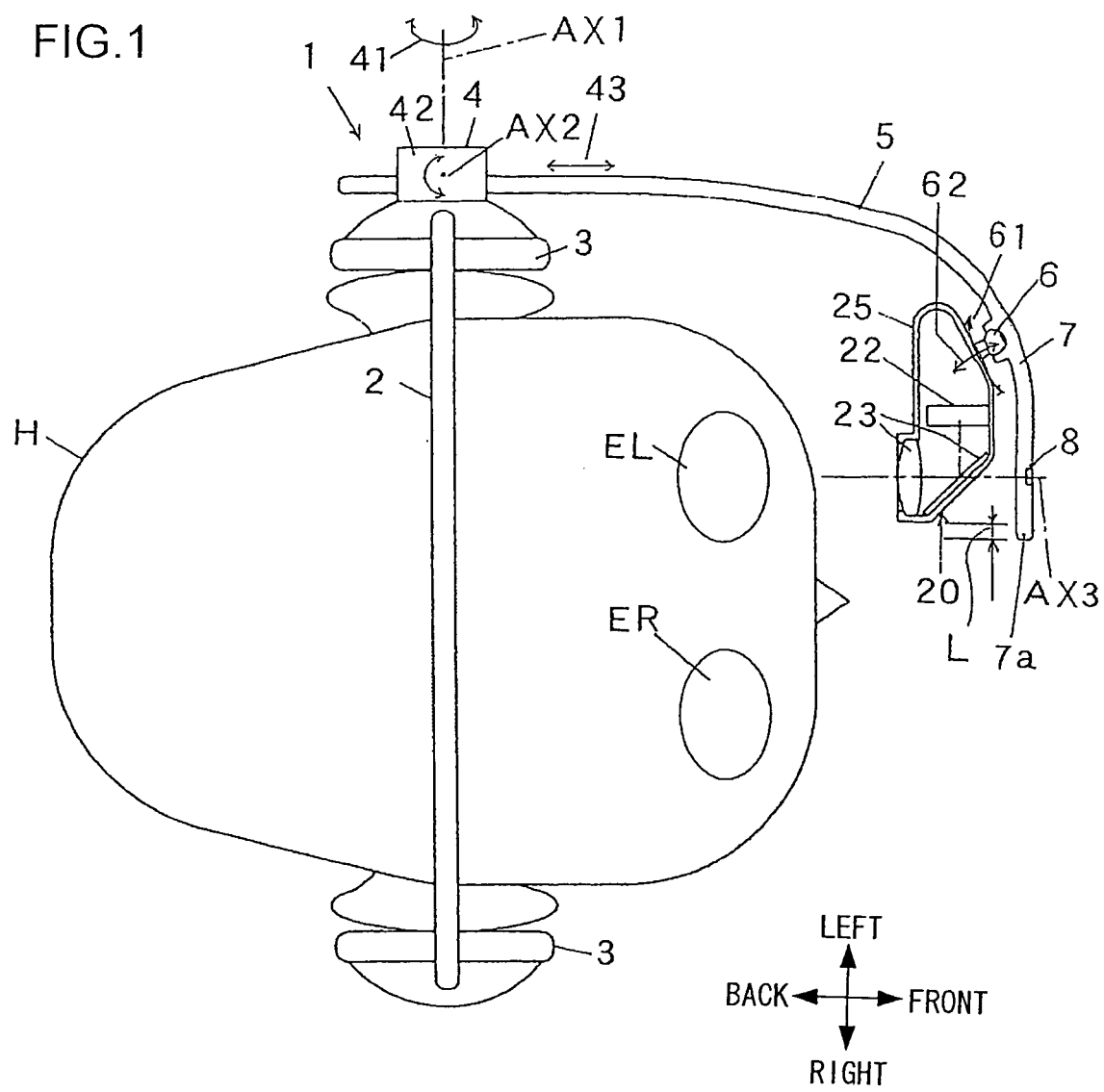
FIG. 1 schematically illustrates a head mount display achieved in a first embodiment, worn on the head of the user.
Figure 2:
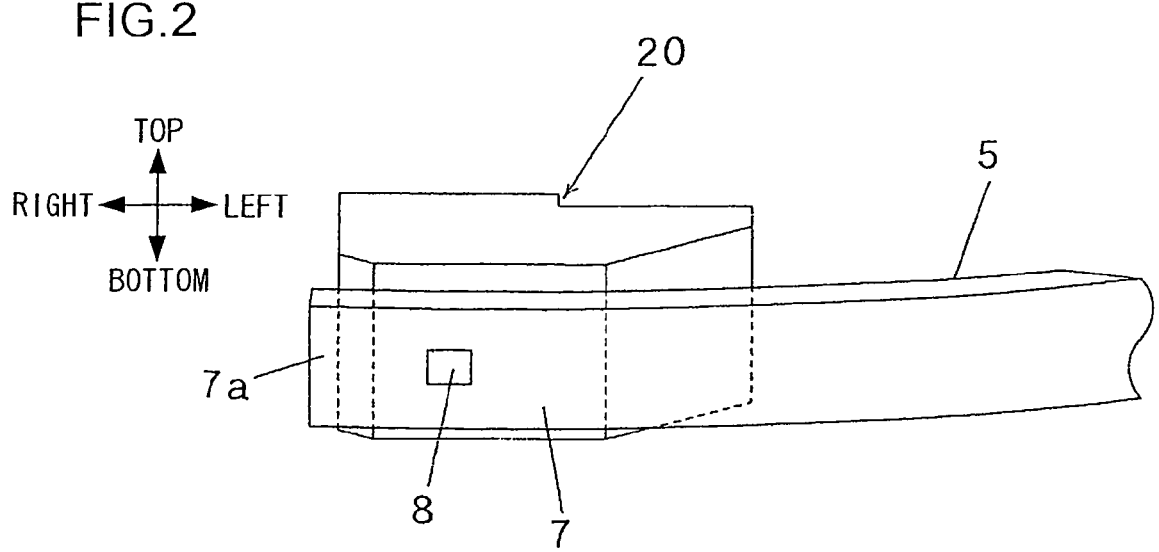
FIG. 2 schematically illustrates an area near a display arm as the front side of the head mount display in FIG. 1 is viewed from diagonally above.
Figure 3:
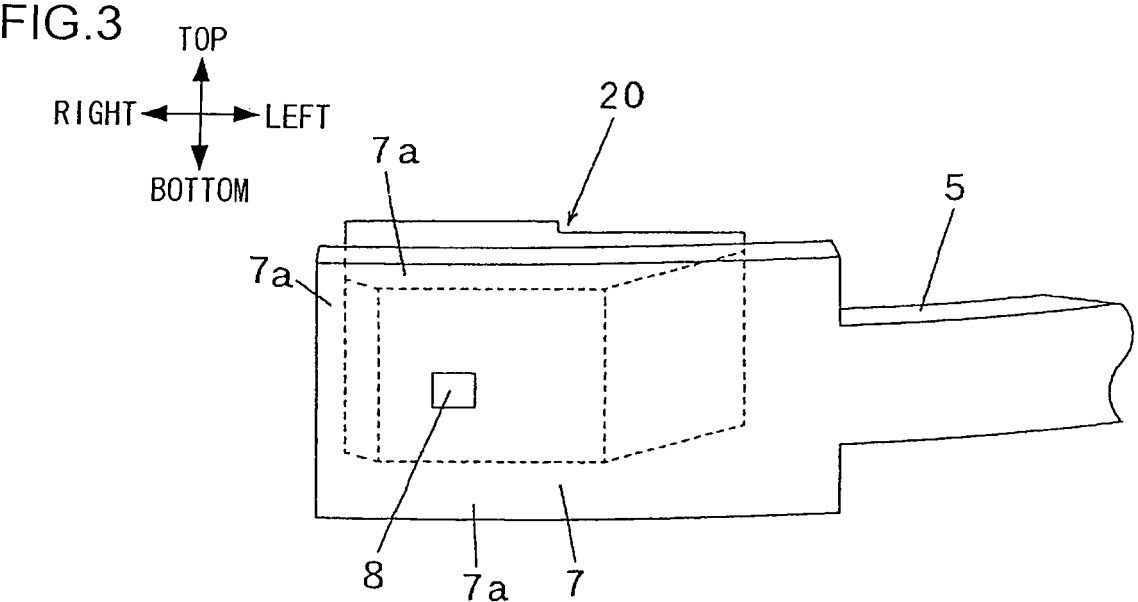
FIG. 3 presents another example of a shape that may be assumed in a protective portion.

In reference to the FIGS. 1 through 3, the first embodiment of a head mount display according to the present invention is described. FIG. 1 schematically illustrates the head mount display achieved in the first embodiment, worn at the head H of the user. It is to be noted that the front, back, left, right, top and bottom sides are defined as shown in the figures so as to facilitate the explanation. Speakers 3 are mounted, each at one of the two ends of an elastic linking arm 2 of a head mount display 1. The linking arm 2 traverses the user's head H over its top (from above), so as to hold the head mount display 1 firmly onto the user's head H.

An arm support unit 4, which displaceably supports a display arm 5, is disposed at the left side speaker 3. The display arm 5 supported via the arm support unit 4 is allowed to rotate around an axis AX1 extending to the left and right, rotate around an axis AX2 extending toward the top and bottom (along the direction perpendicular to the drawing sheet) (see arrow 42) and move forward and backward (see arrow 43).

The display arm 5, extending from the rear toward the front, ranges with a curved contour from an area near the ear of the user wearing the head mount display 1 toward a point to the front of the user's face (user's eye). As described above, the area near the rear end of the display arm 5 is rotatably supported by the arm support unit 4. At the front portion of the display arm 5, a support unit 6 that supports an image display unit 20 is disposed.

The support unit 6, which is disposed at the front portion of the display arm 5 so as to position the image display unit 20 near the eye of the user wearing the head mount display 1, supports the image display unit 20 in such a manner that the orientation of the image display unit 20 relative to the display arm 5 can be adjusted. The image display unit 20 supported by the support unit 6 is allowed to rotate to the left and right around the support unit 6 (see arrow 61) and rotate along the top/bottom direction (see arrow 62). As the user holding the image display unit 20 by hand moves the image display unit 20 around the support unit 6, the orientation of the image display unit 20 relative to the display arm 5 is adjusted. Once the user lets go of the image display unit 20, i.e., once the external force with which the image display unit 20 is displaced stops working, the image display unit 20 becomes locked relative to the display arm 5 via the support unit 6.

By displacing the display arm 5 relative to the arm support unit 4 and displacing or adjusting the orientation of the image display unit 20 relative to the support unit 6, the position of the image display unit 20 can be adjusted so as to set the display unit of the image display unit 20 directly in front of the eye of the user wearing the head mount display 1.

The image display unit 20 includes a display device 22, an optical system 23 that guides an image displayed at the display device 22 to the user's eye and a display case 25 housing the display device 22 and the optical system 23.

FIG. 2 schematically illustrates an area near the display arm 5 of the head mount display 1 as the front side of the head mount display is viewed from diagonally above. As illustrated in FIGS. 1 and 2, the display arm 5 further extends beyond the support unit 6 and the extended portion of the display arm constitutes a protective portion 7. The protective portion 7 is a protective member that prevents any undesirable displacement of the image display unit 20 relative to the display arm 5, which may otherwise be caused by an unexpected external force as the user's hand or some other moving object inadvertently contacts the image display unit 20.

The protective portion 7, constituted with the extended portion of the display arm 5 curving from the area near the user's ear toward a point to the front of the user's face, extends toward the right side in front of the image display unit 20. Thus, the image display unit 20 is placed between the protective portion 7 and the user's head H. As the protective portion 7 is used to protect the image display unit 20 from unexpected external forces, the front end (right-side end of the protective portion 7) along the left/right direction should be aligned with the right-side end of the image display unit 20 or should be set further to the right relative to the right-side end of the image display unit 20. In other words, it is desirable that the length L, by which the portion (extended portion) 7a of the protective portion 7 further extends to the right relative to the right-side end of the image display unit 20, be 0 or more.

As described earlier, the protective portion 7 is constituted with an extended portion of the display arm 5 and thus, the dimension of the protective portion 7 measured along the top/bottom direction, is substantially equal to the dimension of the display arm 5 measured along the top/bottom direction. If the dimension of the display arm 5 taken along the top/bottom direction is smaller than the dimension of the image display unit 20 measured along the top/bottom direction, the top and bottom surfaces of the image display unit 20 will project out beyond the top end surface and the bottom end surface of the protective portion 7 along the top/bottom direction, as shown in FIG. 2. Accordingly, in order to protect the image display unit 20 from unexpected external forces, the dimension of the protective portion 7 measured along the top/bottom direction may be set greater than the dimension of the image display unit 20 measured along the top/bottom direction, as illustrated in FIG. 3. Namely, the protective portion 7 may include an extended portion 7a ranging beyond the image display unit 20 at least toward the right side, the top side or the bottom side.

An illuminance sensor 8 is disposed at the front surface of the protective portion 7. The illuminance sensor 8 detects the level of the light in the surrounding environment and outputs a signal indicating the detected illuminance to a control device (not shown) that controls display at the display device 22. The control device (not shown) adjusts the brightness of the image displayed at the display device 22 based upon the detection signal provided from the illuminance sensor 8. Thus, since the brightness of the image displayed at the display device 22 is altered in correspondence to the illuminance in the surrounding environment, the user is provided with a highly visible image.

It is desirable that the illuminance sensor 8, used to determine the brightness of the image displayed at the display device 22 in correspondence to the illuminance in the surrounding environment, be disposed at a position at which it is able to accurately detect the level of ambient light. Accordingly, the illuminance sensor 8 is disposed at the front surface of the protective portion 7, which remains stationary even when the orientation of the image display unit 20 is adjusted at the head mount display 1 in the embodiment. In this manner, the level of light in the surrounding environment can be detected reliably without being affected by any positional adjustment of the image display unit 20.

In addition, the illuminance sensor 8 is disposed on a line AX3 extending from the line of sight of the user's eye (left eye EL) viewing the image displayed at the image display unit 20 in the head mount display 1 achieved in the embodiment shown in FIG. 1. Namely, the illuminance sensor 8 is disposed on a line substantially extending from the optical axis of the image departing the image display unit 20 toward the user. In this manner, the level of light in the surrounding environment is detected mainly to the front relative to the user, i.e., along the direction in which the line of sight of the eye (right eye ER), which is basically not used to view the image displayed at the image display unit 20 extends. Thus, the left eye and the right eye are allowed to visually perceive the target objects at similar levels of brightness.

It is to be noted that the head mount display 1 assumes a structure that allows the image displayed at the image display unit 20 to be observed either with the left eye or the right eye. For instance, the head mount display 1 may be set as shown in FIG. 1 so as to allow the user to observe the image displayed at the image display unit 20 with his left eye EL. In addition, the user is able to observe the image displayed at the image display unit 20 with his right eye ER by putting on the head mount display 1 with the display arm 5 rotated around the axis AX1 to the left side in the FIG., i.e., toward the rear of the head H in FIG. 1 and its left side and right side (front side and rear side) switched.

The following operational effects can be achieved with the head mount display in the first embodiment described above.

(1) The protective portion 7 formed with an extended portion of the display arm 5 protects the image display unit 20 positioned between the protective portion 7 and the user's head H. Since the protective portion protects the image display unit 20 from any unexpected external forces, the orientation of the image display unit 20 does not need to be readjusted frequently, assuring better convenience.

(2) The extended portion 7a, which ranges further beyond the image display unit 20 at least toward the side moving away from the display arm 5, toward the top side or the bottom side, effectively protects the image display unit 20 from unexpected external forces. Thus, the position of the image display unit 20 does not need to be readjusted frequently.

(3) The level of ambient light can be detected reliably via the illuminance sensor 8 disposed at the protective portion 7 without being affected by any adjustment of the orientation of the image display unit 20 and thus, the user is provided with an easily discernible image. In addition, since the illuminance sensor 8 is disposed on a line substantially extending from the optical axis of the image departing the image display unit 20 toward the user, the ambient light is mainly detected in the area to the front of the user primarily along the line of sight of the user's eye with which the image displayed at the image display unit 20 is not viewed. As a result, the left eye and the right eye of the user are allowed to perceive target objects at roughly equal brightness levels and the user's eyes do not become fatigued too much even after viewing images at the image display unit 20 over an extended period of time.

Second Embodiment

Figure 4:
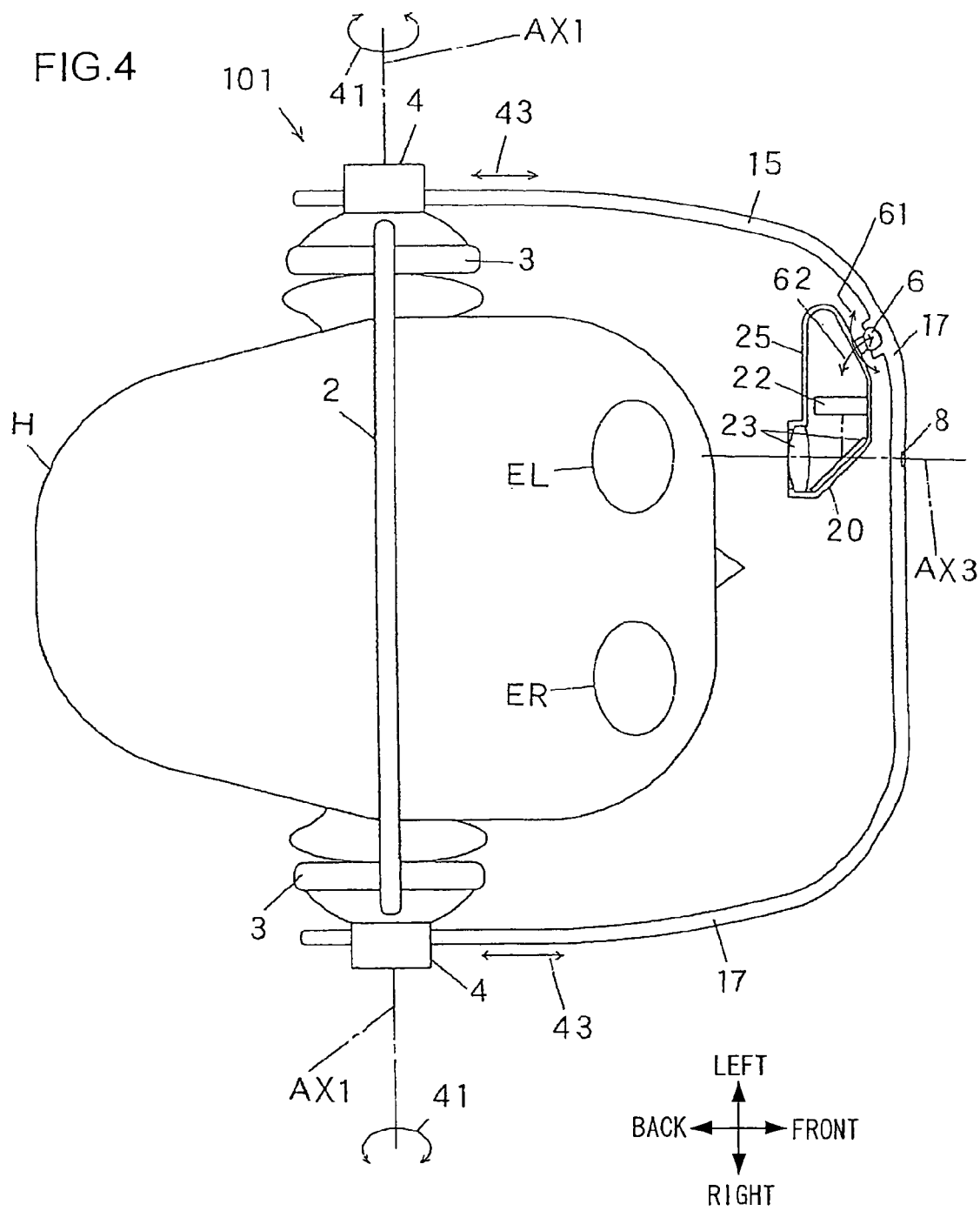
FIG. 4 schematically illustrates the head mount display achieved in a second embodiment, worn on the head of the user.
Figure 5:
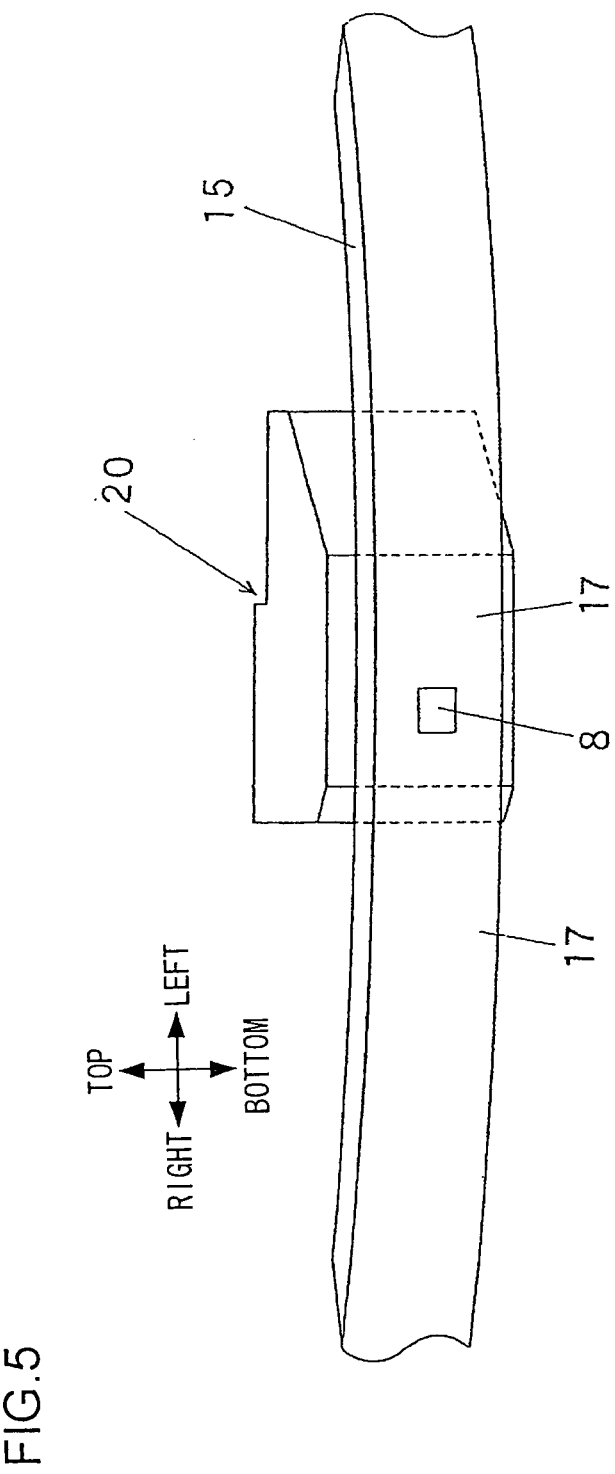
FIG. 5 schematically illustrates an area near the display arm as the front side of the head mount display in FIG. 4 is viewed from diagonally above.
Figure 6:
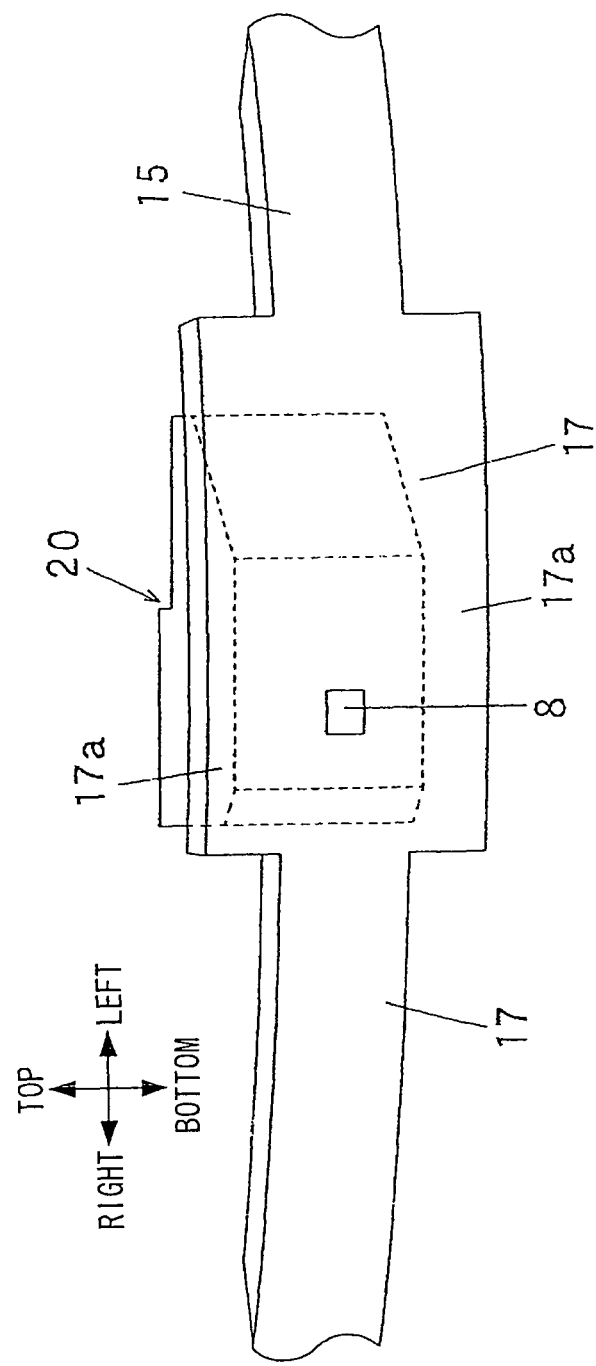
FIG. 6 presents another example of a shape that may be assumed in the protective portion.

The second embodiment of the head mount display according to the present invention is described in reference to FIGS. 4 through 6. The following explanation focuses on differences from the first embodiment, with corresponding reference numerals assigned to components similar to those in the first embodiment. Features of the second embodiment similar to those in the first embodiment are not described in detail. FIG. 4 schematically illustrates the head mount display achieved in the second embodiment, worn at the head H of the user.

A head mount display 101 in the second embodiment includes arm support units 4 that displaceably support a display arm 15, one disposed at the left speaker 3 and the other disposed at the right speaker 3. The display arm 15 is supported via the two arm support units 4. The display arm 15 supported by the arm support units 4 is allowed to rotate around an axis AX1 extending to the left and to the right (see arrow 41) and to move forward and backward as indicated by the arrow 43.

The display arm 15 extends substantially in a semicircle around the head H of the user via a point to the front of the face (the eyes) of the user wearing the head mount display 101. It is displaceably supported via the left-side arm support unit 4 and the right-side arm support unit 4 near the left and right ends. A support unit 6 that supports the image display unit 20 is disposed at the front portion of the display arm 15.

By displacing the display arm 15 relative to the arm support units 4 and displacing the image display unit 20 relative to the support unit 6, the position of the image display unit 20 can be adjusted so as to set the display unit of the image display unit 20 directly in front of the eye of the user wearing the head mount display 101.

It is to be noted that the head mount display 101 assumes a structure that allows the image displayed at the image display unit 20 to be observed either with the left eye or the right eye. For instance, the head mount display 101 may be set as shown in FIG. 4 so as to allow the user to observe the image displayed at the image display unit 20 with his left eye EL. In addition, the user is able to observe the image displayed at the image display unit 20 with his right eye ER by putting on the head mount display 1 with the display arm 5 rotated around the axis AX1 to the left side in the FIG. 4, i.e., toward the rear of the head H in FIG. 4 and its left side and right side (front side and rear side) switched.

FIG. 5 schematically illustrates an area near the display arm 15 of the head mount display 101 as its front side is viewed from diagonally above. As illustrated in FIGS. 4 and 5, the display arm 15 ranges to the left and right at a position to the front of the image display unit 20. Namely, the portion of the display arm 15 present near the image display unit 20 to the front of the image display unit 20 functions as a protective member that prevents undesirable displacement of the image display unit 20, as does the protective portion 7 described earlier in reference to the first embodiment. The image display unit 20 of the head mount display 101 structured as described above is positioned in front of either the left eye or the right eye (left eye) of the user and an extended portion of the protective member ranging toward the other side (right side) from the support unit 6 is supported near the user's ear on the other side (right side). In the following description, this extended portion is referred to as a protective portion 17.

The protective portion 17 in the head mount display 101 in the second embodiment ranges over a wider area than the protective portion in the head mount display 1 in the first embodiment, effectively protecting the user's face, as well as the image display unit 20, from unexpected external forces. In addition, since the display arm 15 is supported via the left-side arm support unit 4 and the right-side arm support unit 4, the image display unit 20 is positioned with good stability in front of the user's eye.

The protective portion 17 is constituted with a portion of the display arm 15 and thus, the dimension of the protective portion 17 measured along the top/bottom direction, is substantially equal to the dimension of the display arm 15 measured along the top/bottom direction. If the dimension of the display arm 15 taken along the top/bottom direction is smaller than the dimension of the image display unit 20 measured along the top/bottom direction, the top and bottom surfaces of the image display unit 20 will project out beyond the top end surface and the bottom end surface of the protective portion 17 along the top/bottom direction, as shown in FIG. 5. Accordingly, in order to reliably protect the image display unit 20 from unexpected external forces, the dimension of the protective portion 17 measured along the top/bottom direction may be set greater than the dimension of the image display unit 20 measured along the top/bottom direction. Namely, the protective portion 17 may include an extended portion 17a ranging beyond the image display unit 20 at least either toward the top side or the bottom side.

An illuminance sensor 8 is disposed at the front surface of the protective portion 17. As shown in FIG. 4, the illuminance sensor 8 is disposed on an extending line AX3 extending from the line of sight of the user's eye (left eye EL) with which the image displayed at the image display unit 20 is viewed at the head mount display 101 achieved in the embodiment.

In addition to the operational effects of the first embodiment, the following operational effects can be achieved through the head mount display in the second embodiment described above.

(1) The image display unit 20 is positioned in front of either the left eye or the right eye (the left eye in FIG. 4) of the user and the protective member constituted with an extended portion ranging further toward the other side (right side in FIG. 4) from the support unit 6 is supported near the ear of the user on the other side (right side in FIG. 4). This structure allows the image display unit 20 to be effectively protected from any unexpected external force and the position of the image display unit 20 does not need to be readjusted frequently, further improving ease of use.

(2) Since the display arm 15 is supported via the two arm support units 4 disposed on the left side and the right side, the image display unit 20 is positioned with a high level of stability in front of the user's eye, allowing the user to more easily view the image displayed at the image display unit 20.

—Variations—

(1) While the right-side end of the protective portion 7 in the head mount display 1 achieved in the first embodiment described above either aligns with the right-side end of the image display unit 20 or ranges further to the right beyond the right-side end of the image display unit 20, the present invention is not limited to this example. For instance, the right-side end of the protective portion may be set so that although the left side of the visual field of the right eye ER of the user may be blocked by the image display unit 20, it is not blocked by the right-side end of the protective portion 7. Namely, the right-side end of the protective portion 7 may be set further to the left relative to the visual field of the right eye ER of the user, which is blocked by the image display unit 20.

Figure 7:
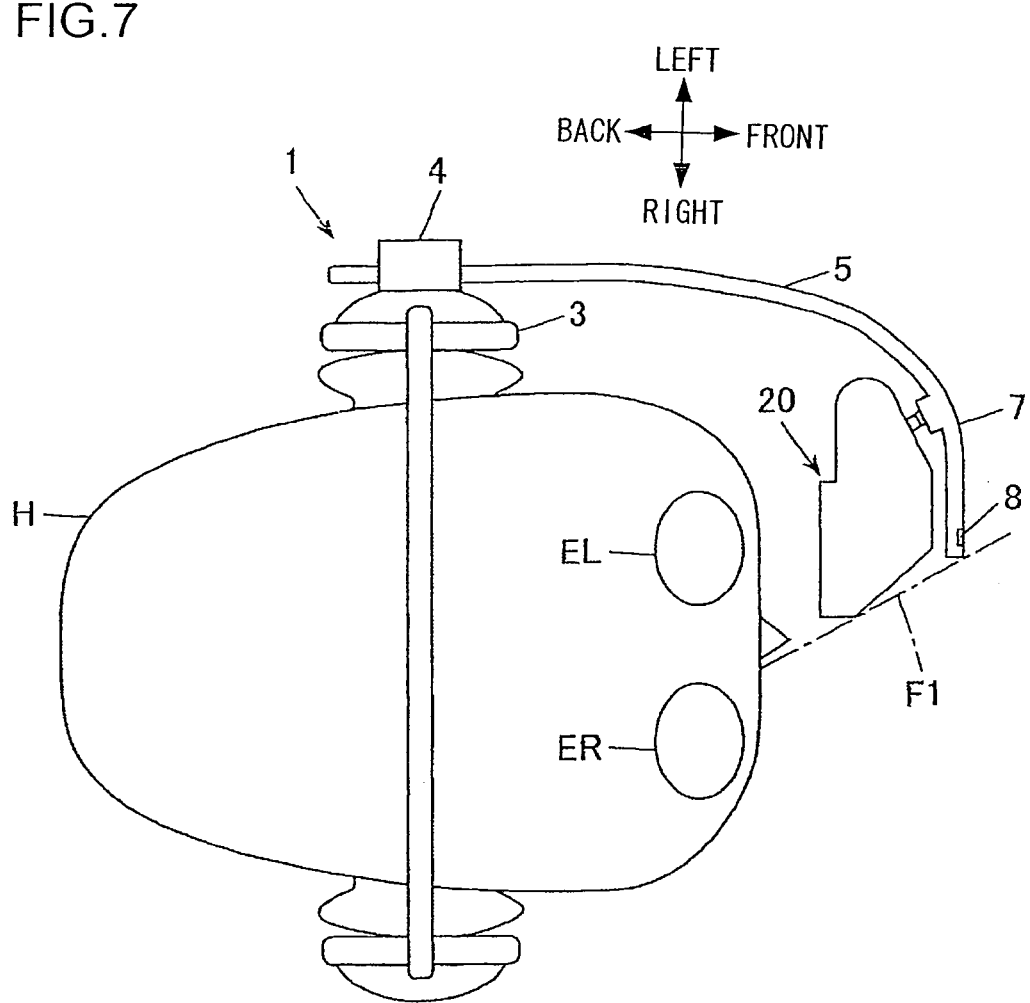
FIG. 7 presents variation 1 of the head mount display.

This structure assures the maximum visual field for the right eye ER, which is not used to view the image displayed at the image display unit 20. It is to be noted that the one-point chain line F1 in FIG. 7 indicates the direction along which the line of sight extends when the visual field of the right eye ER of the user is blocked by the right-side end of the image display unit 20. Namely, the user is able to view the surrounding environment with his right eye ER over the range further to the right relative to the one-point chain line F1, without the image display unit 20 blocking the visual field.

Figure 8:
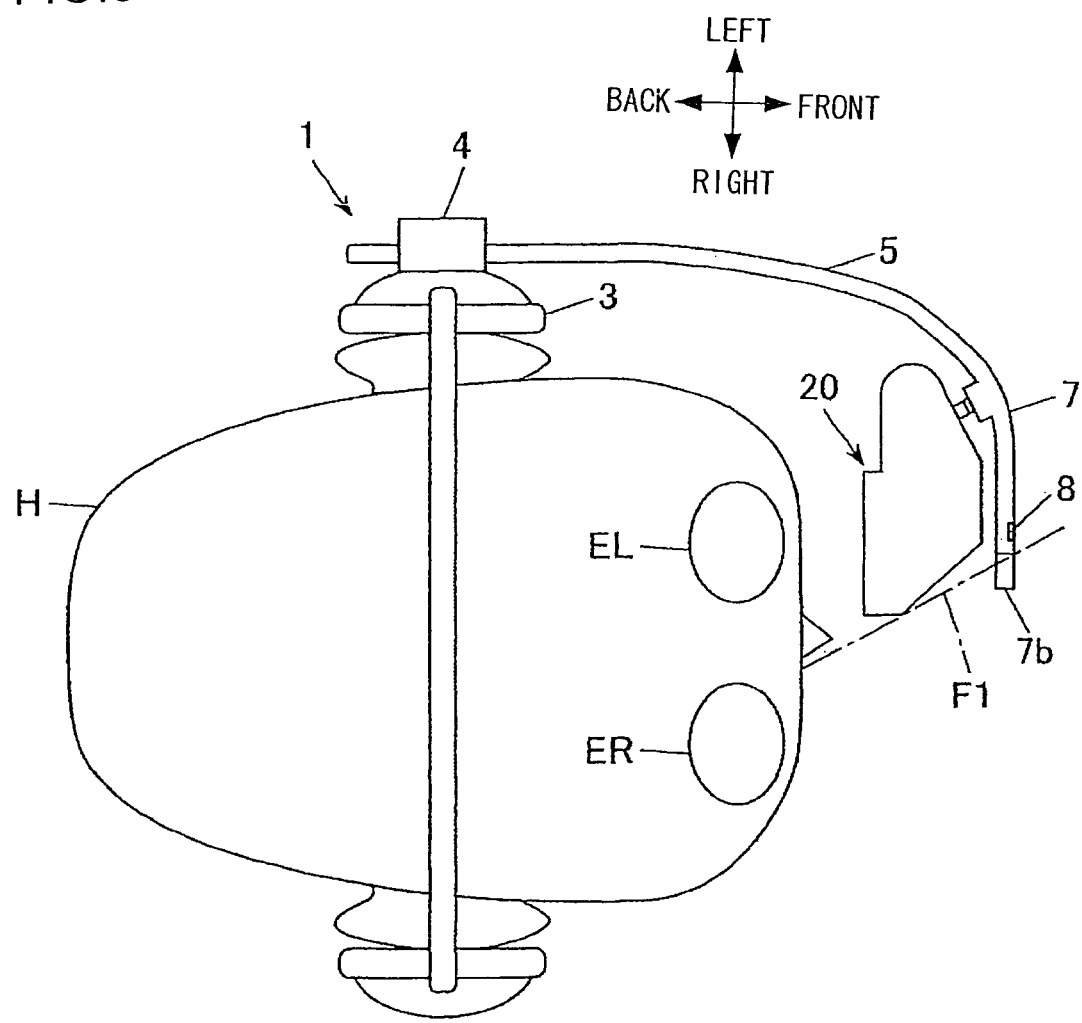
FIG. 8 presents variation 2 of the head mount display.

In addition, as shown in FIG. 8, a right-side end (extended portion) 7b of the protective portion 7, ranging further to the right relative to the one-point chain line F1, may be constituted of a transparent material. This structure assures an ample visual field for the right eye ER and, at the same time, effectively protects the image display unit 20 from unexpected external forces.

Figure 9:
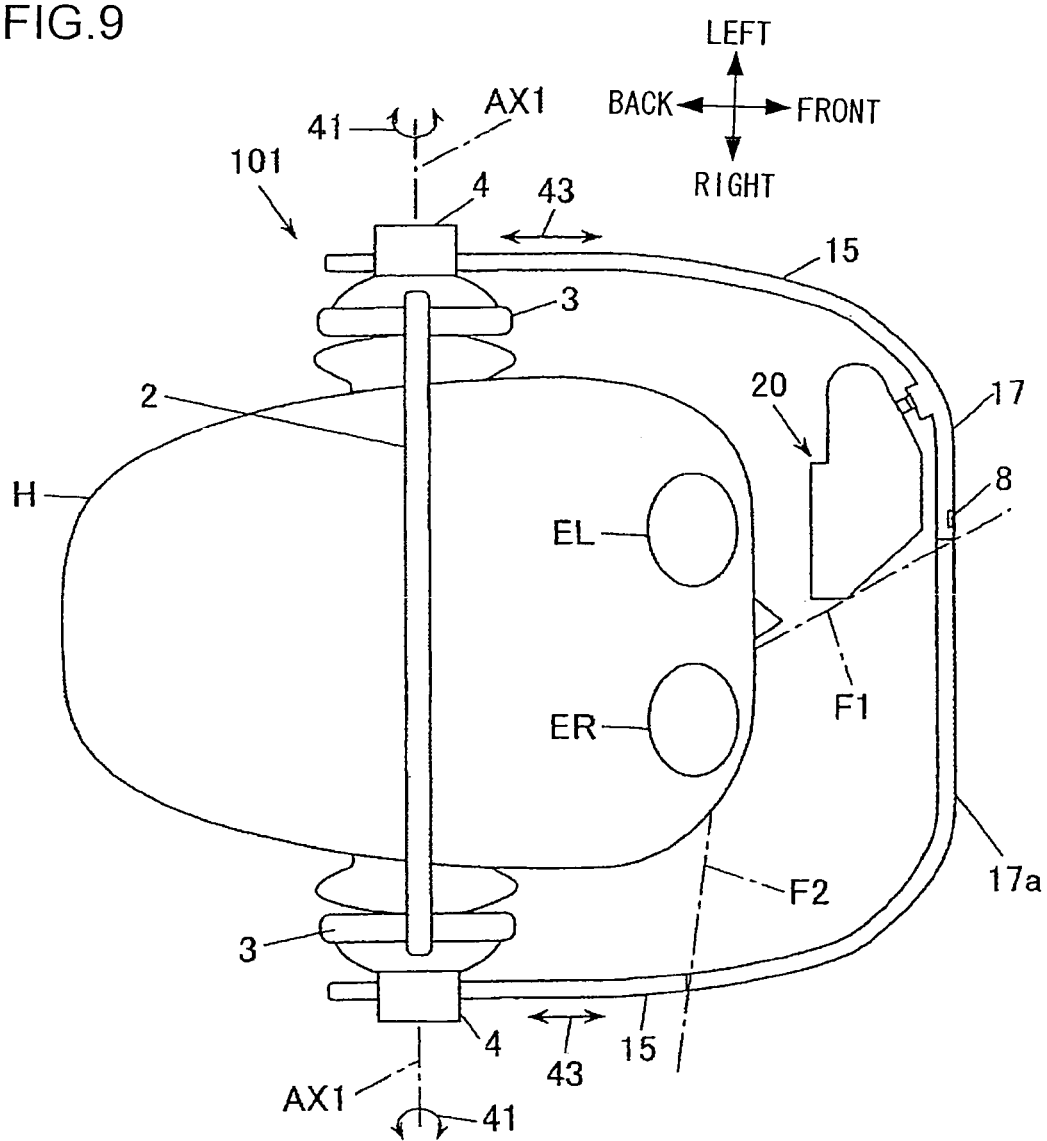
FIG. 9 presents variation 3 of the head mount display.

As a further alternative, the portion of the protective portion 17 in the head mount display 101 in the second embodiment, which is present in the visual field of the right eye ER, may be constituted of a transparent member material, as shown in FIG. 9. Namely, a portion 17a of the protective portion 17, present over the area between the one-point chain line F1 and a one-point chain line F2 indicating the right-side end of the visual field of the right eye ER, may be constituted of a transparent material so as to maximize the visual field for the right eye ER.

Figure 10:
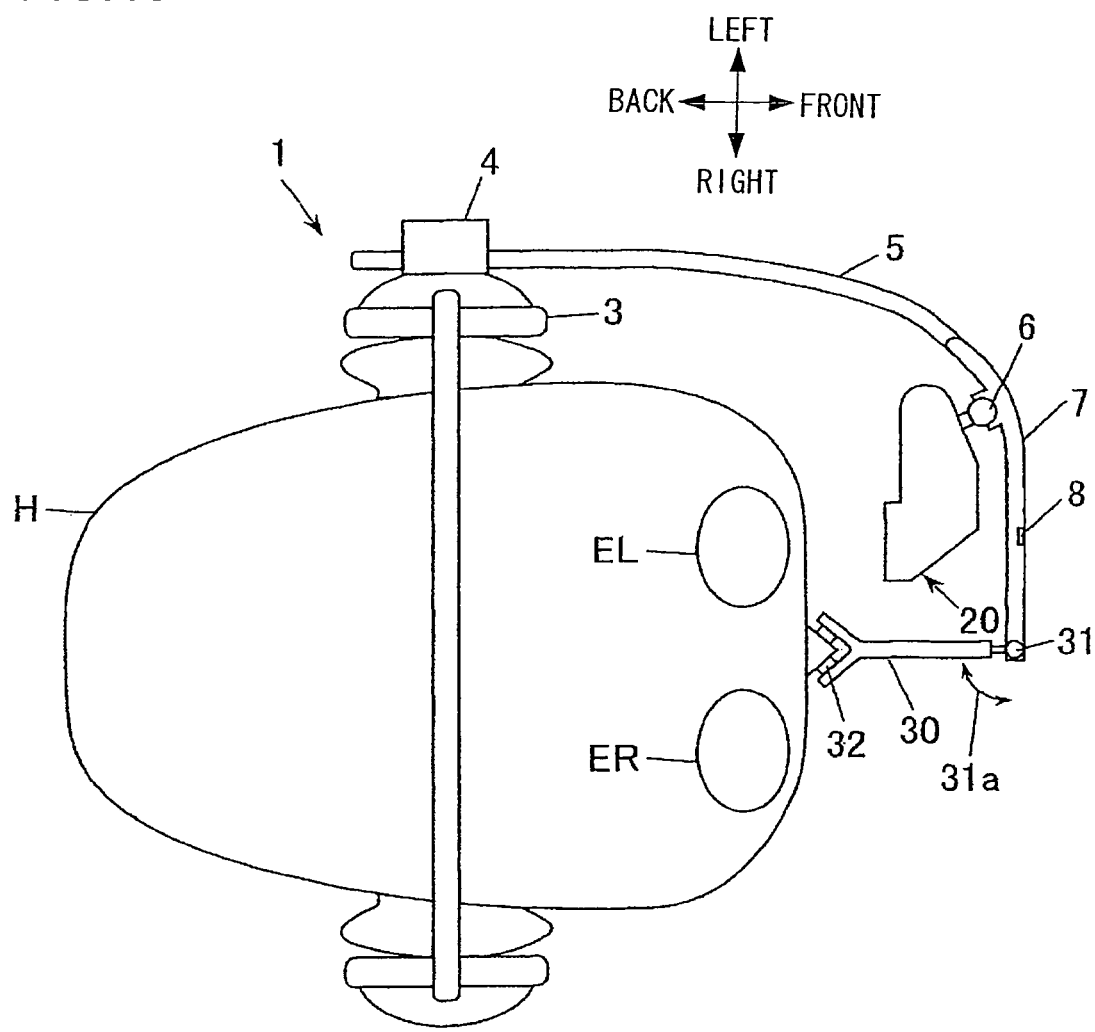
FIG. 10 presents variation 4 of the head mount display.

(2) While the right-side end of the protective portion 7 in the head mount display 1 achieved in the first embodiment described above is left unsupported, the present invention is not limited to this example. For instance, a nose pad 30 may be disposed at the right-side end of the protective portion 7, as shown in FIG. 10, so as to support the right-side end of the protective portion 7 with the user's nose via the nose pad 30. It is to be noted that one end of the nose pad 30 should be rotatably supported via a support portion 31 at the right-side end of the protective portion 7. This structure allows the nose pad 30 to rotate along the horizontal direction over the drawing sheet around the support portion 31 at the right-side end of the protective portion 7, as indicated by the arrow 31a. In addition, a contact portion 32 that comes in contact with the user's nose is disposed at the other end of the nose pad 30. As shown in FIG. 10, the other end of the nose pad 30 assumes a contour conforming to the contour of the nose so as to fit over the nose as the contact portion 32 comes in contact with the user's nose.

Figure 11:
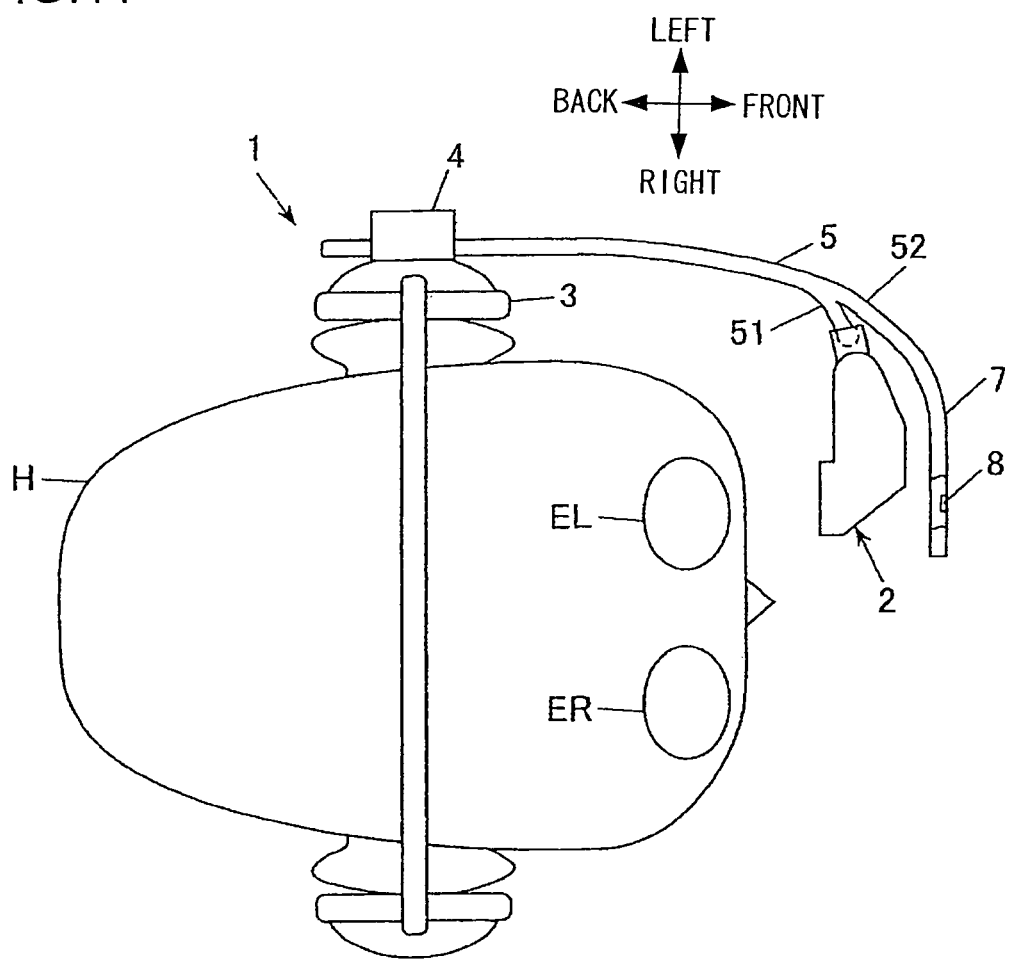
FIG. 11 presents variation 5 of the head mount display.

(3) While the protective portion 7 in the head mount display 1 achieved in the first embodiment described above is constituted with an extended portion of the display arm 5 ranging with a curved contour from the area near the user's ear toward a point to the front of the user's face, the present invention is not limited to this example. For instance, the display arm 5 may branch into two separate portions on the front side, the image display unit 20 may be mounted at one of the branches, i.e., a branch 51, and the other branch 52 may be made to range to the front of the image display unit 20 to function as a protective portion 7, as shown in FIG. 11.

Figure 12:
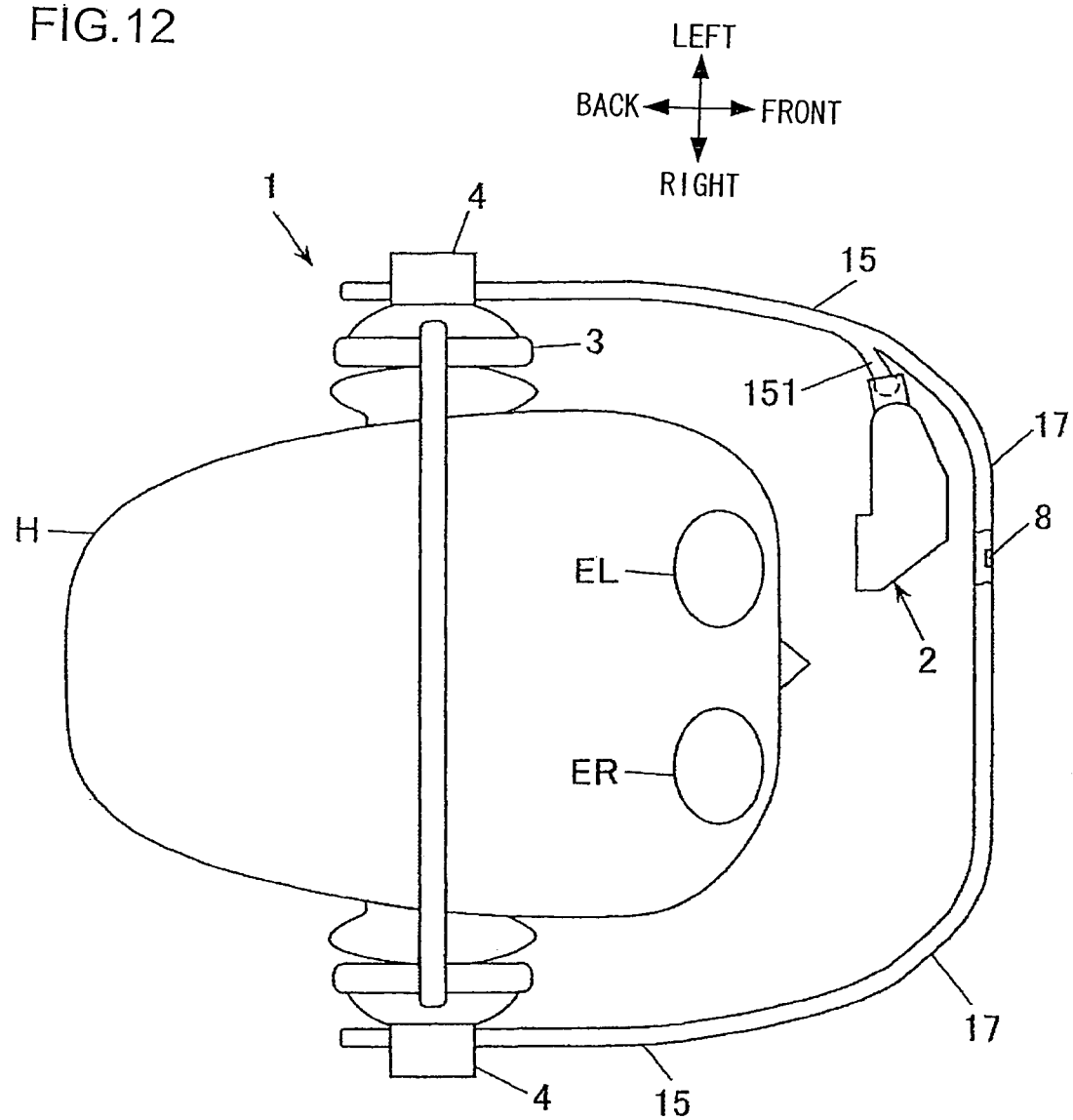
FIG. 12 presents variation 6 of the head mount display.

The head mount display 101 in the second embodiment also allows for a similar variation. Namely, a branch 151 branching out from the display arm 15 at a specific position may be formed and the image display unit 20 may be mounted at the branch 151, as shown in FIG. 12.

(4) The features of the individual embodiments and variations described above may be adopted in combination.

It is to be noted that the present invention is not limited in any way whatsoever to the embodiments described above and may be adopted in a head mount display assuming any of various structures, as long as it includes an image display unit, at which an image is displayed, supported so that its orientation relative to the arm can be adjusted, a mounting unit that can be attached to the user and supports the arm and a protective member extending from the arm to range on an outer side relative to the image display unit to protect the image display unit, with the image display unit positioned between the protective member and the user's head.

As described above, the image display unit is protected from any unexpected external forces and thus the position of the image display unit does not need to be readjusted frequently, improving the ease of use by adopting any of the embodiments of the present invention and any variation thereof.

While the invention has been particularly shown and described with respect to preferred embodiments thereof by referring to the attached drawings, the present invention is not limited to these examples and it will be understood by those skilled in the art that various changes in form and detail may be made therein without departing from the scope and teaching of the invention.

According to the embodiments of the present invention, the image display unit is protected against any unexpected external force and thus, the position of the image display unit does not need to be readjusted frequently, thereby improving the ease of use.

What is claimed is:

1. A head mount display comprising:
an image display unit at which an image is displayed, including an optical system;
an arm including a support unit that supports the image display unit while allowing an orientation of the image display unit to be adjusted;
a mounting unit that supports the arm and is used to attach the head mount display to a user; and
a protective member extending further beyond the support unit of the arm to range on an outer side relative to the image display unit to protect the image display unit, wherein:
the support unit is disposed on a side of the arm facing towards the user so that the image display unit is positioned between a head of the user, to which the mounting unit is attached, and the protective member,
the protective member is formed by extending the arm so that the arm and the protective member are formed as an integrated unit, and the protective member covers at least one portion of the image display unit that is on an opposite side of the optical system of the image display unit; and
the image display unit is rotatable via the support unit in two directions relative to the arm.

2. A head mount display according to claim 1, wherein:

the image display unit is positioned in front of one of a left eye and a right eye of the user to which the mounting unit is attached; and the protective member is disposed so as to range to a position at which the protective member does not block a visual field of another eye of the user.

3. A head mount display according to claim 1, wherein:

the image display unit is positioned in front of one of a left eye and a right eye of the user to which the mounting unit is attached; and the protective member comprises an extended portion extending beyond the image display unit at least toward another side in front of another of the left eye and the right eye, toward a top side beyond the image display unit or toward a bottom side beyond the image display unit.

4. A head mount display according to claim 3, wherein:

the extended portion is constituted of a transparent material.

5. A head mount display according to claim 3, wherein:

the extended portion extends toward the other side and is supported near an ear of the user on the other side.

6. A head mount display according to claim 3, wherein:

the extended portion comprises a nose pad ranging along a contour of a nose of the user so as to fit over the nose as the nose pad comes into contact with the nose of the user.

7. A head mount display according to claim 1, further comprising:

an illuminance sensor disposed at the protective member that detects a illuminance level of ambient light.

8. A head mount display according to claim 7, wherein:

the illuminance sensor is disposed on a line substantially extending from an optical axis of an image departing the image display unit toward the user.

* * * * *